DUST COVER AND KNOB ASSEMBLY

Filed March 22, 1968

*INVENTORS.*
STANLEY F. BROWN
DONALD L. MASSEE
*BY* Nathan N. Kallman
ATTORNEY 3,524,540

DUST COVER AND KNOB ASSEMBLY

Stanley F. Brown, San Jose, and Donald L. Massee, Gilroy, Calif., assignors to International Business Machines Corporation, Armonk, N.Y., a corporation of New York Filed Mar. 22, 1968, Ser. No. 715,260
Int. Cl. B65d *85/02, 85/30*
U.S. Cl. 206—62 8 Claims

ABSTRACT OF THE DISCLOSURE

A dust coved for an airtight enclosure incorporates a separable and replaceable knob assembly, which has a spring-supported, threaded nut that is adapted to be engaged with cooperating threads formed in the assembly of an opposing cover.

BACKGROUND OF THE INVENTION

Field of the invention

This invention relates to a dust cover for an enclosure, and in particular to a cover and knob assembly useful with interchangeable magnetic disk packs.

Description of the prior art

Some presently known magnetic disk storage files employ removeable and replaceable, portable disk packs, so that any pack of disks may be placed in physical storage until needed for recording or readout, while another disk pack is used with the file apparatus to record or read out data. However, when transporting and storing the disk packs during an interchange, it is judicious to form a tightly sealed enclosure that protects the data storage disks from dust and contamination. Otherwise, microscopic particles that find access to the disk surfaces would cause dropout and loss of data.

Solutions of this problem are disclosed in U.S. Pats. 3,176,281 and 3,206,214, wherein dust covers are provided to form enclosures for the storage disks. In the first mentioned patent, a removable top dust cover is provided for enclosing the memory or storage media, while locking means are provided to prevent removal of the top cover from the disk pack, when the pack is not coupled to a memory processing unit. The bottom portion of the disk pack is enclosed by a protective disk which abuts the lower cylindrical periphery of the top dust cover. A resilient dust seal is disposed between the cover and the bottom disk. In order to provide clearance between the top cover and the memory or storage disks, the diameter of the cylindrical top cover is made slightly larger than the disks. Thus, to complete the enclosure, the bottom protective disk must be larger in diameter than the other storage disks.

It had been found desirable in the interests of space and cost to utilize this lower protective disk as a sector disk, which provides indicia as to position and location of the rotating data storage disks, relative to a magnetic transducer or head. In such case, apertures are spaced along a circumference of the sector disk for sensing and developing the desired sector signals. However, the presence of apertures would allow the entry of dust and contaminants into the disk pack during transport and storage. Furthermore, the resilient dust seal between the top cover and the protective disk, which disk is generally made of a metal such as aluminum and therefore subject to thermal effects, does not provide optimum protection from contamination.

Therefore, it has been proposed to utilize a separate, inexpensive bottom dust cover that mates with the top cover to form a substantially airtight enclosure, as described in the latter patent. This allows making the sector disk the same size as the other storage disks thus providing standardization, and eliminates the problem arising from the use of disks of different diameters. In addition, damage to the exposed sector disk which causes misalignment of data sectors with resultant loss of data, is prevented. The use of a bottom dust cover has resulted in a virtually dust free environment in the disk pack enclosure during storage, transport and interchange on the disk file.

However, when inserting the disk pack into a storage file, the top cover is removed prior to use. The file apparatus then supplies its own covering for the disk pack through which filtered air is circulated. Removal of the disk pack requires reassembly of the top cover to the pack and bottom cover. The frequent assembly and disassembly of the cover causes wear of the locking parts. Stripping of threads and other deleterious effects are manifest. Thus, if the cover assembly locking parts are damaged, the cover cannot be used and must be replaced in its entirety, which is expensive and time consuming.

SUMMARY OF THE INVENTION

An object of this invention is to provide a novel and improved cover and knob assembly for an airtight enclosure.

Another object of this invention is to provide a cover having an easily replaceable knob portion including locking parts.

Another object is to provide a cover structure that minimizes the stripping of threaded elements used for facile coupling of the cover when forming an enclosure.

According to this invention, a dust cover for an enclosure comprises an annular structure to which a knob assembly is joined by means of a removable snap ring. To provide compliance or give when coupling the dust cover with an opposing cover to form the enclosure, a threaded nut is positioned against a resilient coil or spring within a central channel of the knob assembly. The nut has an angular outer surface, such as a hexagonal construction, and the channel wall is grooved to prevent rotation of the nut. The threaded nut in the dust cover may be rapidly coupled with a threaded screw of the opposing cover, whereby both covers form a substantially airtight enclosure.

BRIEF DESCRIPTION OF THE DRAWING

The foregoing and other objects, features and advantages of the invention will be apparent from the following more particular description of a preferred embodiment of the invention as illustrated in the accompanying drawing in which.

Similar numerals refer to similar elements throughout the drawing.

DESCRIPTION OF THE PREFERRED EMBODIMENT

Figure 3:
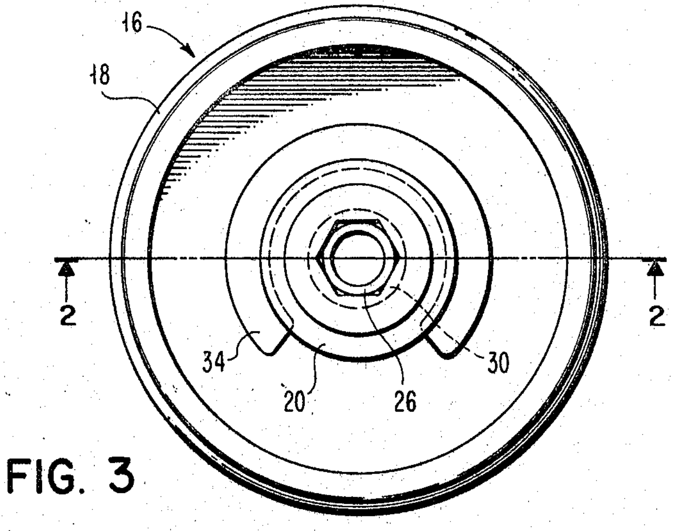
FIG. 3 is a top plan view of the knob assembly of FIG. 2.
Figure 2:
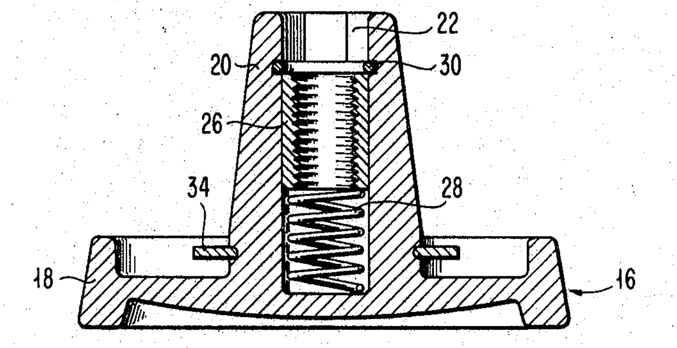
FIG. 2 is a side sectional enlarged view of the knob assembly, illustrated in FIG. 1.
Figure 1:
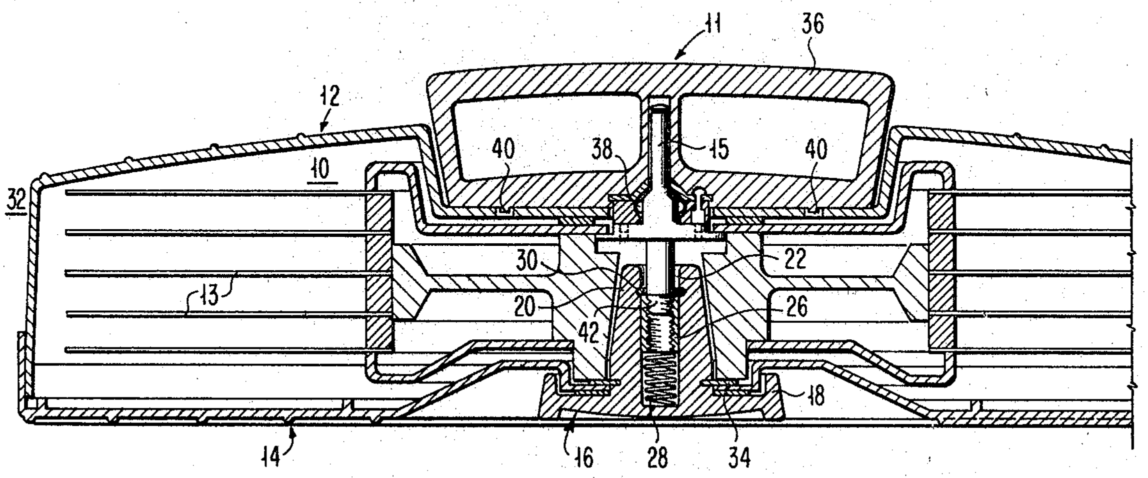
FIG. 1 is a side sectional view of a disk pack enclosure, partly broken away, depicting the bottom dust cover and knob assembly of this invention.

With reference to the drawing, a disk pack enclosure 10 includes a top dust cover 12 and bottom dust cover 14 that mate to form a substantially airtight housing, wherein one or more disks 13 may be supported substantially free from ambient atmosphere. The top dust cover 12 supports a handle assembly 11 joined to a locking means 15, described in detail in the aforementioned Pat. 3,176,281.

In accordance with this invention, the bottom dust cover 14 incorporates a removable knob assembly 16 that is formed as an annular structure having a crown portion 18 and a central tapered projecting portion 20. The crown portion 18 serves as a grasp or clasping means, whereas the projecting portion 20 is employed for maintaining the means for coupling the knob 16 and bottom cover 14 to the top cover 12. The projecting portion 20 has a cylindrical channel or well 22, in which connection means are disposed for engagement with cooperating connecting means in the top cover 12.

The connection means of the bottom dust cover and knob assembly include a threaded metallic nut 26 having an outer diameter and configuration that ensures a close fitting, sliding relation with the inner cylindrical wall of the tapered section 22. To this end, the nut 26 is preferably angular, such as hexagonal, and the corners or angles of the nut are disposed in shallow vertical slots (not shown) spaced around the wall encompassing the channel 24. The nut 26 is seated on a resilient element or spring 28, having substantially the same outer diameter. One end of the spring 28 rests on the bottom of the recess 22, while the other spring end abuts the threaded nut 26 at its lower extremity. A retaining washer 30 is secured in a lateral groove or slot formed in the inner wall of the tapered section 22, to prevent escape of the nut 26 and spring 28. The groove is located at a predetermined height of the channel 22 so that the nut 26 partially compresses the spring 28.

The knob assembly 16 is assembled to the bottom dust cover 14 that is so configured as to cap the cylindrical portion 32 of the top cover 12. The knob assembly 10 is disposed in a central aperture of the bottom dust cover 14, and is secured to the bottom cover 14 by means of a split washer or snap ring 34, which locks to the portion 20. Removal of the snap ring 34 allows separation of the knob assembly 16 and the connection means from the bottom dust cover 14. The knob 16 may be made of an inexpensive plastic, for example, and replacement of the assembly 16 including the threaded nut 26 would be a simple rapid step.

The handle 11 of the top cover 12 is locked in place by detent spheres 38. The top cover handle 11 is positioned by locating guide lugs 40 in a circular guide groove formed on the surface of the top cover. In the central portion of the top cover handle 11, there is an assembly including a fixed threaded screw 42 that is engageable with the threaded nut 26 when locking the top cover 12 to the bottom dust cover 14. When locked to a spindle assembly of the disk drive apparatus, rotation of the handle 11 in one direction allows removal of the top cover 12 from the disk pack. When disengaged from the spindle assembly, rotation of the handle 11 in the opposite direction causes locking of the handle 11 and the top cover 12 to the bottom dust cover 14. Similarly rotation of the knob assembly 16 affords release or attachment of the bottom cover 14. Details of the top cover assembly are presented in U.S. Pat. 3,176,281, assigned to the same assignee as the present invention.

During assembly, the tendency is to urge the dust cover towards the disk pack. At such time the force exerted by the operator is translated along the axes of the engaging screw 42 and nut 26. The axial force causes wear and stripping of the laterally disposed threads. The rate of wear is dependent upon the type of threaded material, and the frequency of assembly and disassembly, among other things. By virtue of the "floating" nut 26 the axial force is substantially absorbed and dissipated through the resilient means or spring 28. In addition, in the event that the threads of the nut 26 are damaged, or if the need for replacement of the knob assembly 16 arises, removal of the snap ring 34 affords an easy uncoupling of the knob from the bottom dust cover 14. Economy is thus realized, since the dust cover itself may be used again with a new knob assembly.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A disk pack cover assembly forming an enclosure comprising:

a top dust cover having a handle assembly;

a bottom dust cover for mating with said top dust cover to form a dust-free enclosure;

a knob assembly attached to said bottom dust cover, including means for quickly disengaging said knob assembly from said bottom cover;

a channel formed in said knob assembly having a cylindrical wall with an open end and a closed end;

a threaded element disposed in said channel;

a resilient means positioned between said threaded element and the closed end of said channel; and means for retaining said threaded element in contact with said resilient means in said channel;

the resilient means affording compliancy of said threaded element when said bottom assembly is being joined to the top cover.

2. A cover assembly as in claim 1 wherein said knob assembly is attached to and disengageable from said bottom cover by means of a snap split retainer ring.

3. A cover assembly as in claim 1 wherein said threaded element is a floating type angular nut seated to said resilient means.

4. A cover assembly as in claim 3, wherein said angular nut is secured within longitudinal grooves formed in the wall of said channel, thereby precluding rotation of said nut.

5. A cover assembly as in claim 1, wherein said resilient means is a helical spring.

6. A cover assembly as in claim 1, wherein said threaded element retaining means comprises an apertured washer disposed in a lateral slot of the wall of said channel.

7. An assembly as in claim 1, wherein said top dust cover includes a cooperating threaded element engageable with said threaded element disposed in the channel.

8. An assembly as in claim 1, including at least one storage disk within such enclosure.

References Cited

UNITED STATES PATENTS

| | | | |
|---|---|---|---|
| 2,634,934 | 4/1953 | Martin et al. | 151—41.73 |
| 2,996,178 | 8/1961 | Forrest | 206—52 |
| 3,005,292 | 10/1961 | Reiland | 151—41.75 |
| 3,154,193 | 10/1964 | Alden | 206—52 |
| 3,176,281 | 3/1965 | Pattison | 206—62 |

FOREIGN PATENTS 293,143 7/1928 Great Britain.

WILLIAM T. DIXSON, Jr., Primary Examiner

U.S. Cl. X.R.

151—41.75; 220—55; 274—42; 340—174.1